United States Patent [19]

Briet

[11] Patent Number: 5,248,171
[45] Date of Patent: Sep. 28, 1993

[54] FLEXIBLE RUBBER TUBE HAVING RIGID PLASTIC BRANCH CONNECTION

[75] Inventor: Gilles Briet, Gueugnon, France

[73] Assignee: Hutchinson, Paris, France

[21] Appl. No.: 581,423

[22] Filed: Sep. 11, 1990

Related U.S. Application Data

[60] Continuation of Ser. No. 257,261, Oct. 12, 1988, abandoned, which is a division of Ser. No. 147,950, Jan. 25, 1988, abandoned.

[30] Foreign Application Priority Data

Jan. 12, 1987 [FR] France .................. 87 00754

[51] Int. Cl.⁵ .................................. F16L 41/06
[52] U.S. Cl. ........................... 285/156; 285/150; 285/294
[58] Field of Search ............ 285/150, 294, 156, 297; 156/296, 304.2; 428/36.2

[56] References Cited

U.S. PATENT DOCUMENTS

| | | | |
|---|---|---|---|
| 3,634,167 | 1/1972 | Plontke | 156/296 |
| 3,707,032 | 12/1972 | Brunelle et al. | 264/251 |
| 3,873,391 | 3/1975 | Plauka et al. | 156/296 |
| 3,927,695 | 12/1975 | Crockwell | 428/36.8 |
| 4,059,291 | 11/1977 | Acda et al. | 285/21 |
| 4,514,244 | 4/1985 | Shaefer et al. | 156/304.2 |
| 4,655,480 | 4/1987 | Thalmann | 285/156 |
| 4,676,532 | 6/1987 | Gronau et al. | 285/156 |
| 4,708,374 | 11/1987 | Cox | 285/156 |
| 4,718,700 | 1/1988 | Horch et al. | 285/156 |
| 4,740,017 | 4/1988 | Grabowski | 285/156 |
| 4,792,160 | 12/1988 | Hwang | 285/150 |

FOREIGN PATENT DOCUMENTS

| | | |
|---|---|---|
| 547828 | 11/1985 | Australia . |
| 0191700 | 8/1986 | European Pat. Off. . |
| 1255290 | 11/1967 | Fed. Rep. of Germany . |
| 2157386 | 10/1985 | United Kingdom . |

*Primary Examiner*—Allan R. Kuhns
*Attorney, Agent, or Firm*—Browdy and Neimark

[57] ABSTRACT

In a method for producing devices such as branch connections or similar on flexible tubes or pipes, particularly those with a rubber base, a rigid core is placed inside said tube or pipe intended to support it and a branch connection or similar is molded in situ on the tube or pipe by injection of plastic material of thermoplastic or thermosetting type, the branch connection grips round said tube or pipe on the external face thereof and is adhered thereto by the very effect of molding.

17 Claims, 6 Drawing Sheets

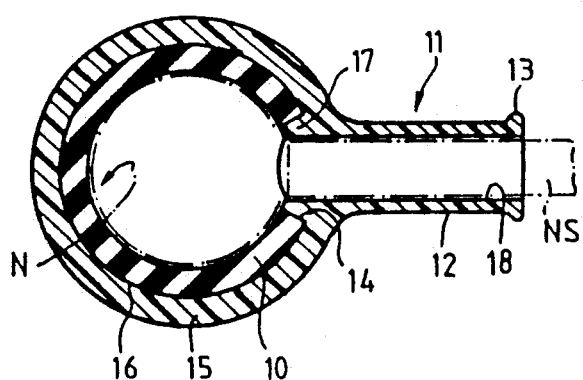
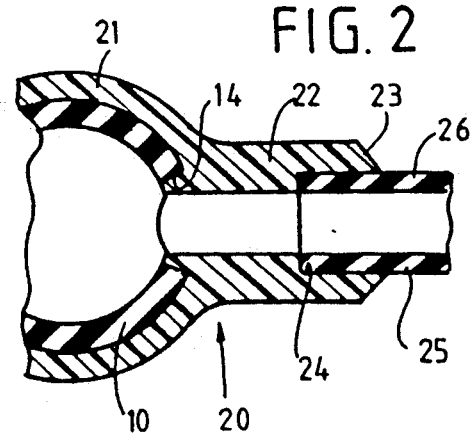
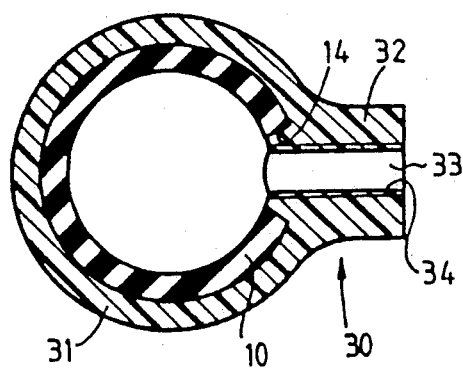
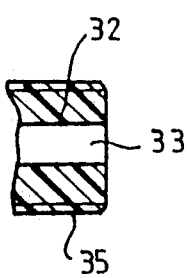
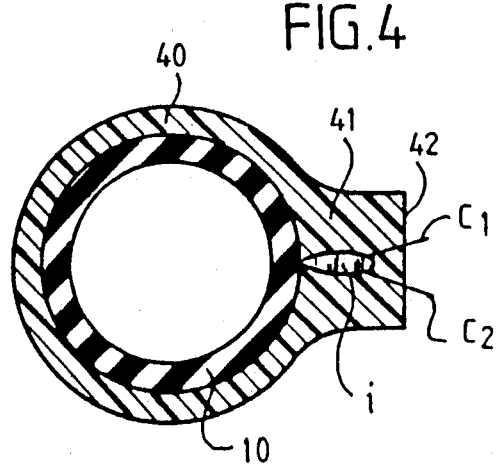
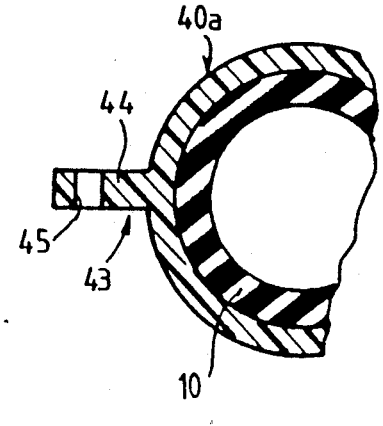

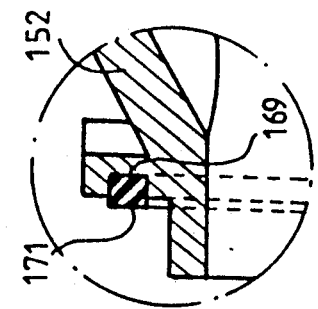
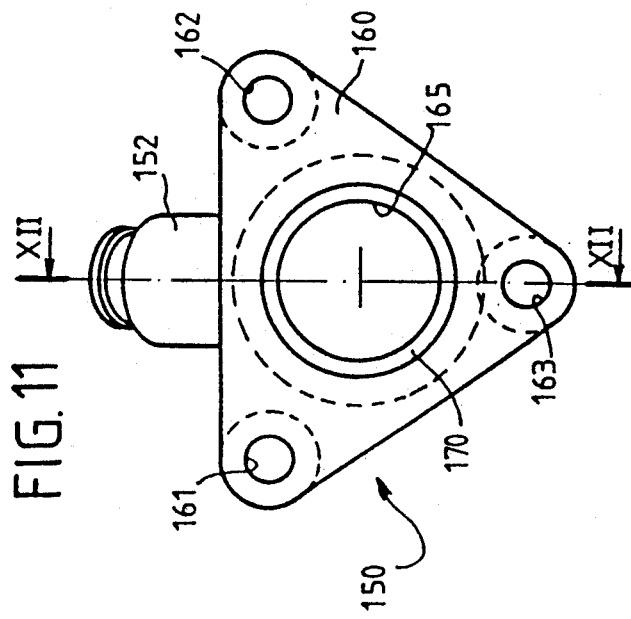
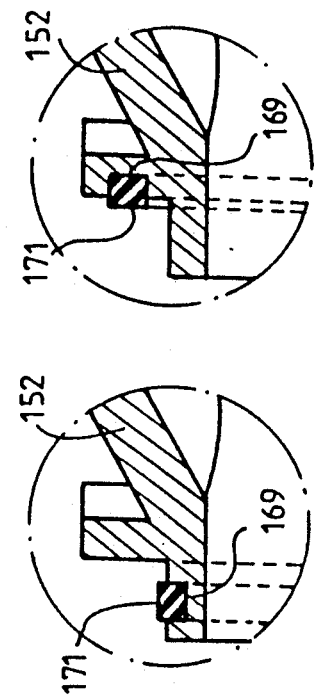
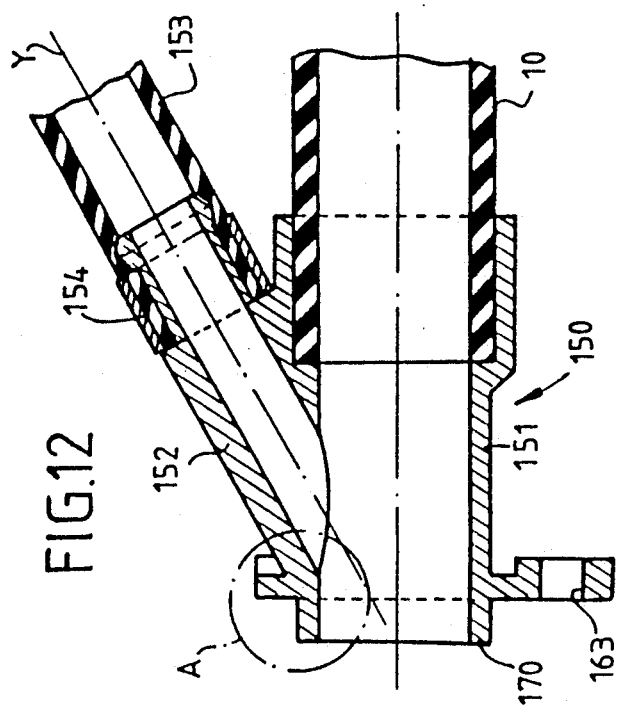
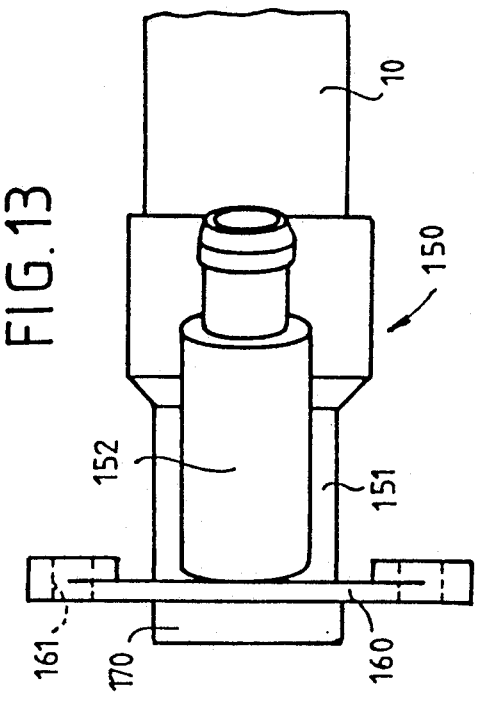

FLEXIBLE RUBBER TUBE HAVING RIGID PLASTIC BRANCH CONNECTION

This is a continuation of parent co-pending application Ser. No. 07/257,261, filed Oct. 12, 1988, now abandoned, itself a division of application Ser. No. 147,950 filed Jan. 25, 1988, now abandoned.

BACKGROUND OF THE INVENTION

1. Field of the Invention

The invention relates to improved branch connections on flexible rubber tubes or pipes.

It is known that flexible vulcanized rubber based tubes or pipes used in the motor car industry, in particular but not exclusively those connected between the engine and the radiator for conveying the cooling fluid, must frequently comprise drain or branch connections which, whatever their use, require a junction or tapping on the main pipe. To form these tappings, it has already been proposed to cut the main pipe, to fit the two parts of the pipe onto the arms of a plastic material or metal T joint and the branch pipe on the body of a T then to secure them by means of clamping collars fixed close to the ends of the pipe sections. This very simple and low cost device however requires three assembly operations and the provision of an assembly line for the corresponding members, whereas present day techniques in the motor car industry seek to do away with these operations and the management which they imply of loose parts.

2. Description of the Prior Art

Therefore it has been proposed to replace the plastic T device by a branch connection obtained by molding a rubber coating about a part at least of a rigid tubular insert forming part of the branch connection, as described for example in FR-A-2 549 196. Such a method makes it possible to obtain satisfactory and widely used branch connections. However, their use is sometimes limited by their cost which in some cases is higher than the prior T, and this is why the applicant has sought to improve the existing method so as to lower the price of the devices obtained while guaranteeing the quality of the manufactured products, in particular in so far as the absence of leaks are concerned of the fluid flowing through the flexible tube or pipe.

SUMMARY OF THE INVENTION

The problem raised has been solved, following work carried out by the applicant, by means of a method making it possible to mold rigid plastic materials on flexible rubber with satisfactory adherence. Such a method in fact, starting with rubber based flexible tubes or pipes makes it possible to provide the branch connection tubes or pipes or similar devices with plastic material molded in situ and which are adapted to form the basis of any junction or tapping on said flexible tube or pipes.

A method in accordance with the invention, for producing branch connections or similar devices on flexible tubes or pipes, particularly those with a rubber basis, consists in placing inside said tube or pipe a rigid core intended to support it, and a branch connection or similar device is molded in situ on the tube or pipe by injection of rigid plastic material of thermoplastic or thermosetting type, which branch connection grips round said tube or pipe on the external face thereof and is adhered thereto by the very effect of molding.

With such a method, for molding the thermoplastic or thermosetting material on the rubber based flexible tube or pipe, a normal injection press may be used, for example with mobile secondary core or cores adapted for cooperating with one or more corresponding housings of the core supporting the tube or pipe for manufacturing a one-way or multiway branch connection or for manufacturing similar devices, for example one or more drain tappings.

Molding of the rigid plastic material on the outside of the rubber based flexible tube or pipe makes it possible to give the branch connection or similar device integrally formed with the tube or pipe all the desired shapes, depending on the requirements of practice. Thus, the injection mold may be adapted so as to provide a main flexible tube or pipe with one or more rigid end piece(s) with end flanges intended for the subsequent fitting of one or other flexible pipe(s) forming bypasses of the main pipe, or else for providing the main flexible tube or pipe with a connection inside or outside which a secondary tube or pipe is secured.

In another embodiment, the mold for injecting the plastic material molded in situ on the rubber based tube or pipe is formed so as to provide on its external surface a threaded portion on which a drain plug may be screwed.

In a variant, the secondary core of the plastic material injection mold is formed so as to provide the internal wall of the connection with a threaded tapping with which a drain screw or any other appropriate element may then cooperate, for example a sensor element.

In yet another embodiment, the plastic material injection mold is formed so that it houses inserts, such as pressure or temperature probes which, after removal from the mold, are thus simply and reliably positioned with respect to the flexible tube or pipe, and inside the plastic material part molded over said flexible tube or pipe.

In an advantageous embodiment, an injection mold is used for the thermoplastic or thermosetting material which associates with the connection a fixing means such as a lug, flange or similar for connecting the assembly to a vehicle or to a motor vehicle member, in the case of a flexible tube or pipe used in this field.

In another embodiment, the molding is conducted so as to form in the extension of an end piece an appendix which penetrates into an orifice of the tube or pipe and comes flush with the internal surface of said tube or pipe.

In a variant, the plastic material connection molded in situ over the tube or pipe includes means for snap fit engagement of a sleeve gripping a second tube or pipe forming a bypass with respect to the main tube or pipe.

BRIEF DESCRIPTION OF THE DRAWINGS

Other features and advantages of the invention will be clear from the following description, given by way of example and with reference to the accompanying drawings in which:

FIG. 1 is a cross sectional view of a branch connection of the invention;

FIG. 2 is a partial view similar to that of FIG. 1, of another embodiment;

FIGS. 3A and 3B show, in two partial views, two other variants of construction;

FIG. 4 is a view similar to the three previous ones but for yet another embodiment;

FIG. 4a is a partial view of yet another variant;

FIG. 11 is an elevational view of a complex connection of the invention;

FIG. 12 is a sectional view through line 12—12 of FIG. 11;

FIG. 13 is a top view of the device shown in FIGS. 11 and 12; and

FIGS. 14 and 15 are detail views, on a larger scale, of the part encircled at A in FIG. 12.

DESCRIPTION OF THE PREFERRED EMBODIMENTS

Figure 5:
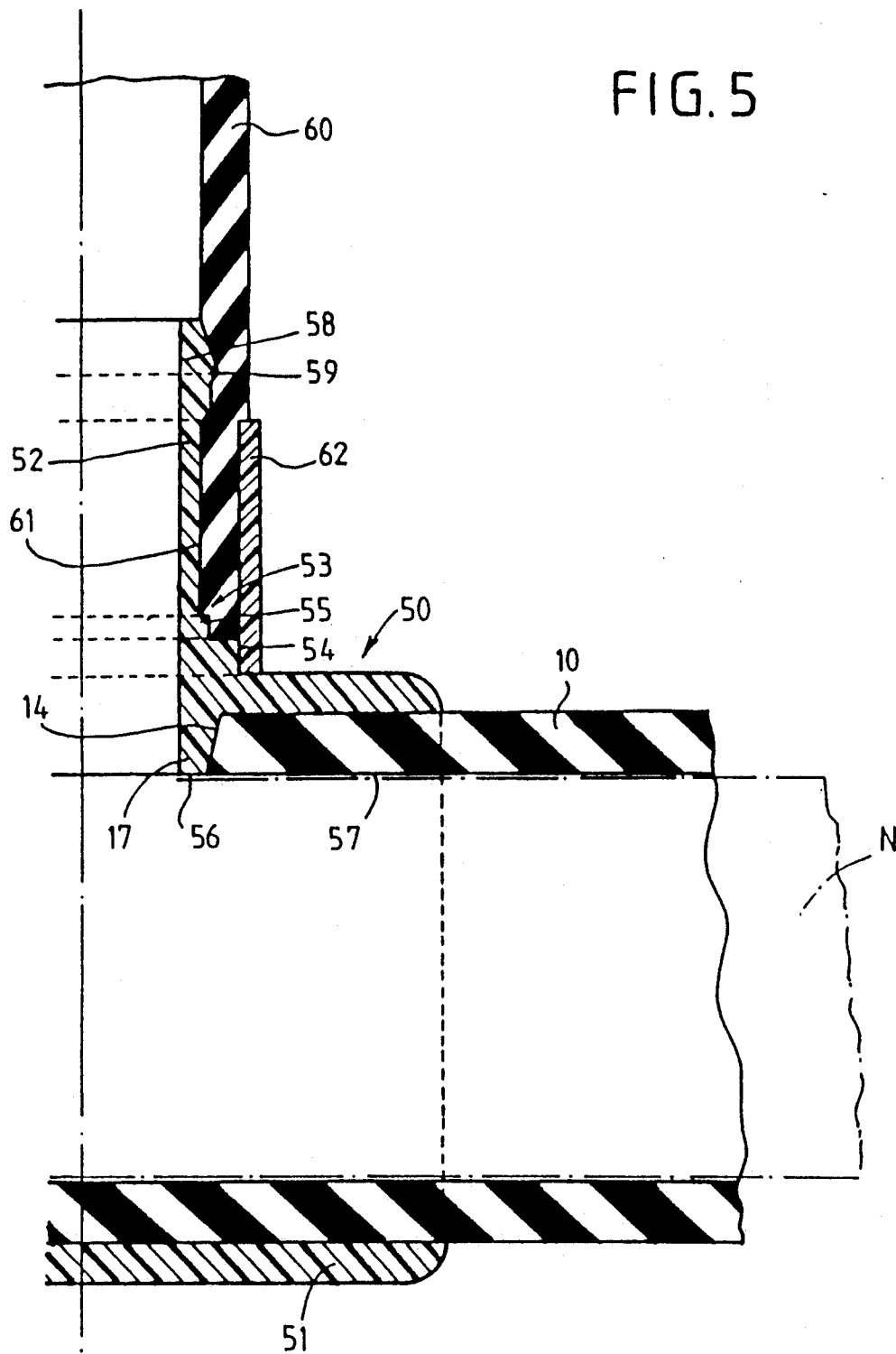
FIG. 5 is a half view, on a larger scale and in longitudinal section, of a connection device of the invention.

Reference is made first of all to FIG. 1 which shows the first embodiment of a connection device of the invention. It is provided on a rubber based tube or pipe, for example a hose for a motor vehicle radiator or a duct connecting to a heater unit of such a vehicle, said indications of course having no limitative character. To provide this tube or pipe 10 with a branch 11, illustrated here in the form of an end piece with body 12 and end flange 13, in accordance with the invention, said end piece is provided by molding in situ on the tube 10 a plastic material of thermoplastic or thermosetting type forming the end piece. For this, a through orifice 14 is first of all formed in the wall of tube 10, then a rigid core shown schematically at N is placed in the tube and the assembly formed by said tube and the core N is positioned in a plastic material injection press, not shown. The mold of said press is formed so as to define the shape of connection 11, that of a sleeve 15 forming a single piece with said connection and which grips around tube 10 of a large extent of its external surface 16, as well as that of an appendix 17 whose length is substantially equal to the thickness of said tube and which extends the end-piece 11 inside sleeve 15, substantially in the zone of connection of one to the other.

To form the internal channel 18 of the tubular end piece 11, the injection mold is provided with a secondary mobile core, for example such as shown schematically at NS and which penetrates into a recess in the main core N during molding.

The thermoplastic or thermosetting material which forms end-piece 11 and sleeve 15 is chosen depending on the requirements of practice as well as the material forming the tube or pipe 10 to which the end-piece adheres satisfactorily by the very effect of molding.

Tests carried out by the applicant have shown that good results have been obtained in the provision of a polypropylene end piece on an EPDM or polychloroprene or silicone tube when the molding is carried out at an injection pressure between 600 and 1200 bars and at an injection temperature between 160° and 300° C.

For a pressure of the order of 0 to 4 bars of the fluid transported, a device obtained by the above defined method has proved to be satisfactory in use during the whole life of the motor vehicle, namely about 1800 to 2200 hours.

In the embodiment shown in FIG. 2, the main rubber based tube or pipe 10 is that connecting the engine to the radiator of a motor vehicle, said main tube or pipe being adapted to be equipped with a tube 25 of a secondary circuit going towards the heater unit of the vehicle. The branch connection 20 includes a sleeve 21 gripping the tube and a short stub 22 extending radially with respect to said sleeve and of a greater thickness than this latter so as to form, in the vicinity of its free chamfered end 23, a cylindrical recess 24 in which tube 25, also with a rubber basis, is received and which is fixed by its external surface 26 in the recess 24 of stub 22. The manufacture of the device in this embodiment is simliar to that described above, except that the injection mold is of a different shape so as to make it possible in a single operation to mold the plastic material forming the sleeve 21 and stub 22 on the tube or pipe 10 and on tube 25 simultaneously.

In the embodiment shown in FIG. 3A, the rubber based tube or pipe 10 is provided with a branch connection 30 made from a plastic material molded in situ on the tube or pipe and which has, projecting radially with respect to a sleeve 31 gripping the tube or pipe 10 over substantially the whole of its periphery, a tubular stub 32 whose longitudinal bore 33 is provided with an inner thread 34 with which the screw of a drain, not shown, is adapted to cooperate. A drain plug is shown in the schematical representation in FIG. 3B for cooperating with a threaded portion 35 of stub 32 whose internal bore 33 is then smooth.

In the embodiment shown in FIG. 4 the rubber based tube or pipe 10 is not formed with a through orifice in its wall, as in the above described embodiments, but is provided, by molding in situ of a plastic material of the thermoplastic or thermosetting type, with a sleeve 40 gripping the tube over substantially the whole of its periphery with a cylindrical boss 41 projecting radially with respect to the sleeve. In this embodiment, the injection mold for the plastic material does not have a secondary core, but is provided with an insert i, for example a pressure or temperature sensor which, after removal of the assembly from the injection mold, is in contact with tube 10 with its conductors such as C1 or C2 projecting from the end face 42 of the boss 41 for connection to a vehicle dashboard indicator or similar.

In the embodiment shown schematically in FIG. 4a, the rubber based tube or pipe 10 is provided with a branch connection 40a made from a thermoplastic or thermosetting material molded in situ on said tube or pipe and which has complementarily to an end-piece, not shown, a means 43 for fixing to a support or to a vehicle part, said means being formed by an attachment, a lug, a flange or similar 44 which may or may not have an orifice 45 for passing therethrough a fixing screw or similar.

It is a method similar to the one described above which is used for manufacturing the device shown in FIG. 5. The rubber based tube or pipe 10 formed with an orifice 14 and provided with a core N is positioned in a plastic material injection press for the formation by molding in situ on said tube, of a branch connection 50 with sleeve 51 gripping said tube and with an end-piece 52 integral with the sleeve 51. In this embodiment, the branch connection includes, in the connection zone of end-piece 52 to sleeve 51, a zone 53 with steps 54 and 55, as well as an appendix 17 housed inside the orifice 14 of the tube and whose internal surface 56 is flush with the internal surface 57 of tube 10, whereas at its end removed from that of the appendix 17, the end-piece 52 is formed with a flange 58, also stepped, so as to form a rib 59 projecting from its external face. With the shape of this latter, obtained directly by molding, it is possible to satisfactorily position on said end-piece a second rubber based tube or pipe 60 which thus forms a bypass circuit with respect to the main circuit of the pipe or tube 10 and whose internal surface 61 is applied to the external surface of the end-piece, by taking on the shape thereof, when a plastic material ring 62 which bears on sleeve 51 and an end face of step 54 clamps said tube 60 on the body 52 of the end piece.

Figure 6:
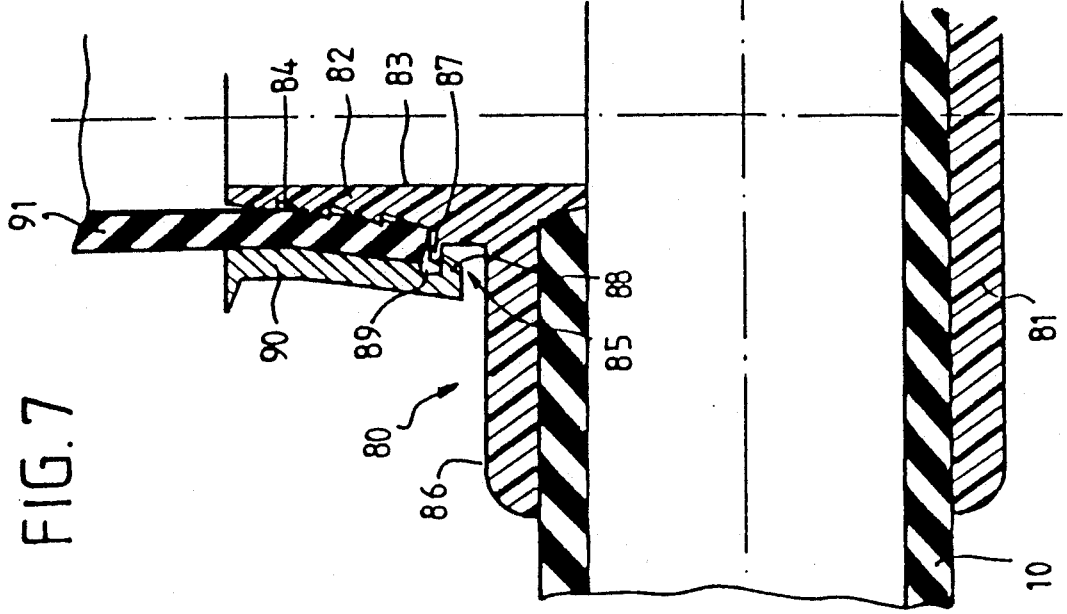
FIGS. 6 and 7 are views similar to that of FIG. 5 for two other variants.

In the embodiment shown in FIG. 6, the rubber based tube or pipe 10 is provided, using the same method as that described above, with a branch connection 65 made from a plastic material molded in situ on said tube and which includes a sleeve 66 extending angularly over the greatest part of the periphery of the tube with a tubular stub 67 directed radially with respect to said sleeve. In this embodiment, an appendix 69 housed in the orifice 14 of tube 10 as far as the internal surface 70 of said tube extends the stub 67 with smooth internal surface 68 but with an external surface comprising fish scale or herringbone pattern connected by a base 73, with triangular cross section, of the edge of sleeve 66 to a nose-piece 72 thus removed both from sleeve 66 and stub 67. Nose piece 72 is adapted for snap fit engagement with a rib 75 of a sleeve 76 fitted on a secondary tube or pipe 77, also made from a rubber based material, an appropriate choice of the dimensions of tube 77 and of sleeve 76 providing satisfactory securing of tubes 10 and 77, to which the roughnesses of the external surface 71 of the stub 67 of the branch connection contribute.

Figure 7:
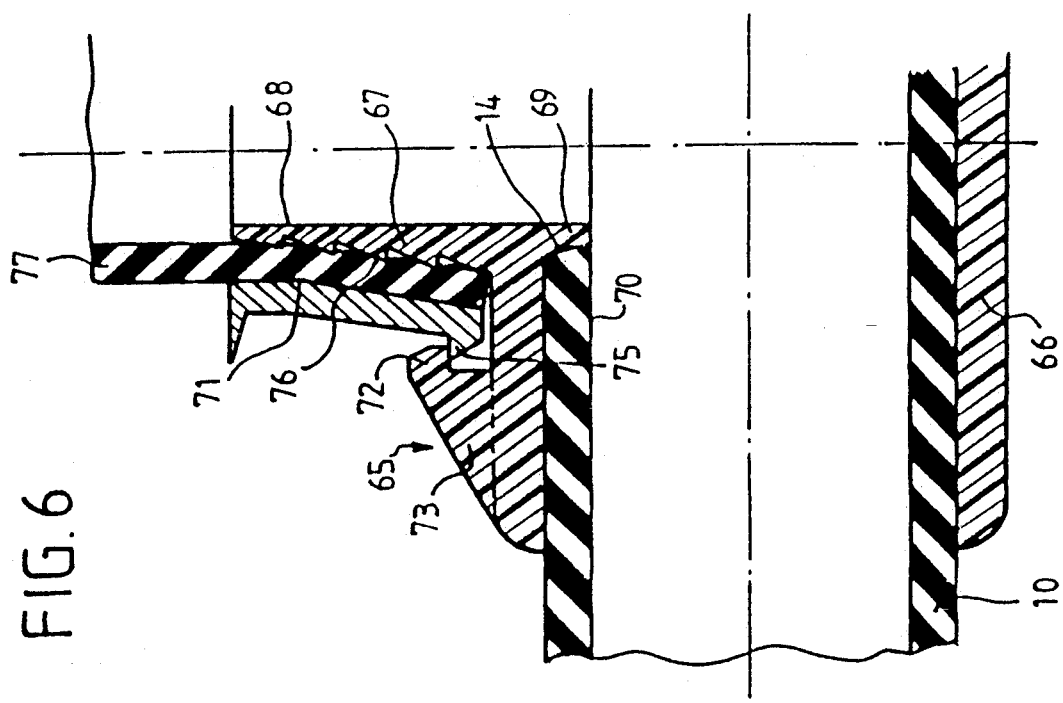

In the embodiment shown in FIG. 7, the main rubber based tube or pipe 10 is provided with a branch connection 80 which includes, as in the preceding embodiment, a sleeve 81 over the major part of the angular periphery of said tube and a tubular stub 82, projecting radially with respect to said sleeve, with a smooth internal surface 83 and an external surface 84 having roughnesses similar to that of the embodiment of FIG. 6. In this variant, the zone 85 of connection of sleeve 81 to stub 82 includes, at a distance from the external surface 86 of said sleeve, a nose-piece 87 projecting from the external lateral surface 82 and which engages by snap fitting with the edge 88 of a rib 89 formed in a sleeve 90 which is fitted on a tube or pipe 91 intended to form a secondary circuit when it is fixed to stub 82. In the preceding embodiment, an appropriate choice of the dimensions of the secondary tube 91 and of the plastic material sleeve 90 provide satisfactory securing of said secondary tube and said branch connection.

In the embodiment shown in the right hand part of FIG. 8, the main rubber based tube or pipe 10 is provided with a branch connection 95 which includes, as in the preceding embodiment, a sleeve 96 over the major part of its angular periphery and a tubular stub 97 of the same shape as sleeve 92 of the embodiment described with reference to FIG. 7. Here, however, a hollow shaft 98 projecting from the external surface 99 of sleeve 96 has, at its free end, a nose-piece 100 turned towards the axis X of the hollow shaft and which engages by snap fitting with a rib 101 formed on the external surface of the sleeve 102 which grips a second tube or pipe 103 intended to form a secondary circuit when it is fixed to stub 97.

Figure 8:
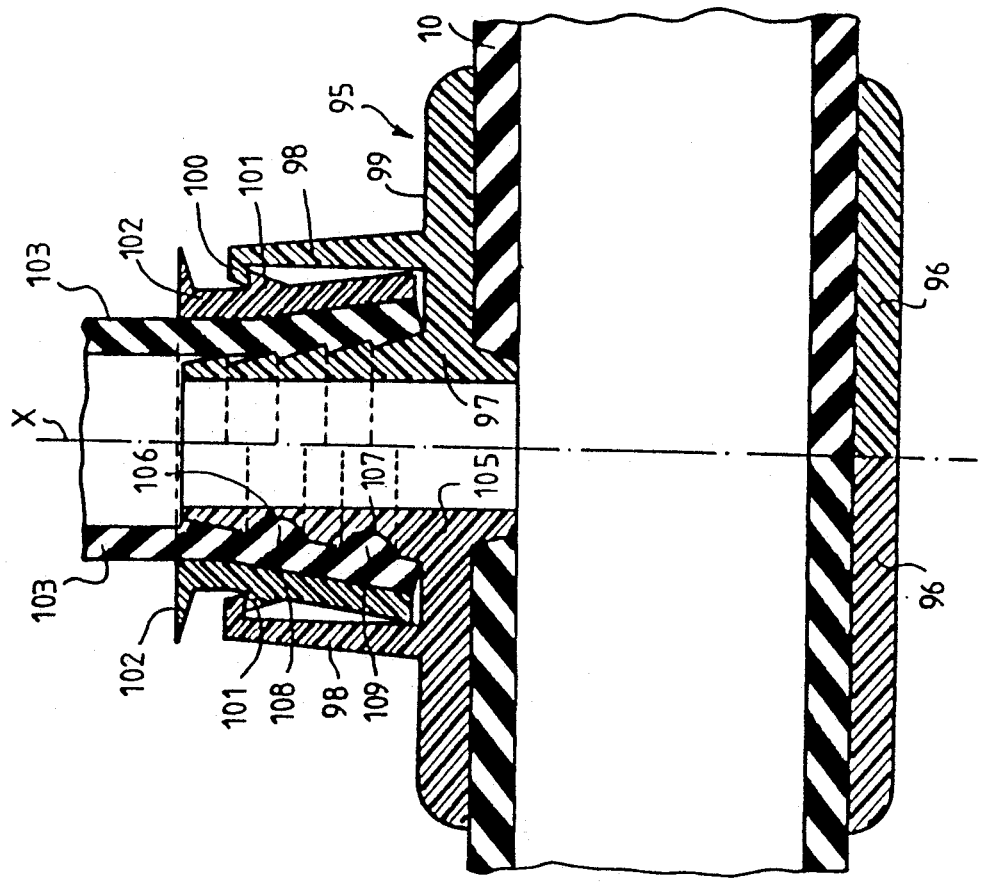
FIG. 8 is a representation similar to FIGS. 6 and 7 and illustrates, in two half views, two other embodiments of a device of the invention.

The structure of the embodiment shown in the left hand part of FIG. 8 is similar to that which has just been described for the right hand part, except that stub 105, similar to stub 97b of the preceding embodiment, has an external surface with one or more circular grooves such as 106 or 107, with axis X. In this embodiment, where connection to the secondary tube 103 also takes place via a hollow shaft 98 and a lip 101 of a sleeve 102, the internal surface of said secondary tube is formed in the vicinity of its end with internal flanges 108 and 109 of a cross section matching that of grooves 106 and 107.

Figure 9:
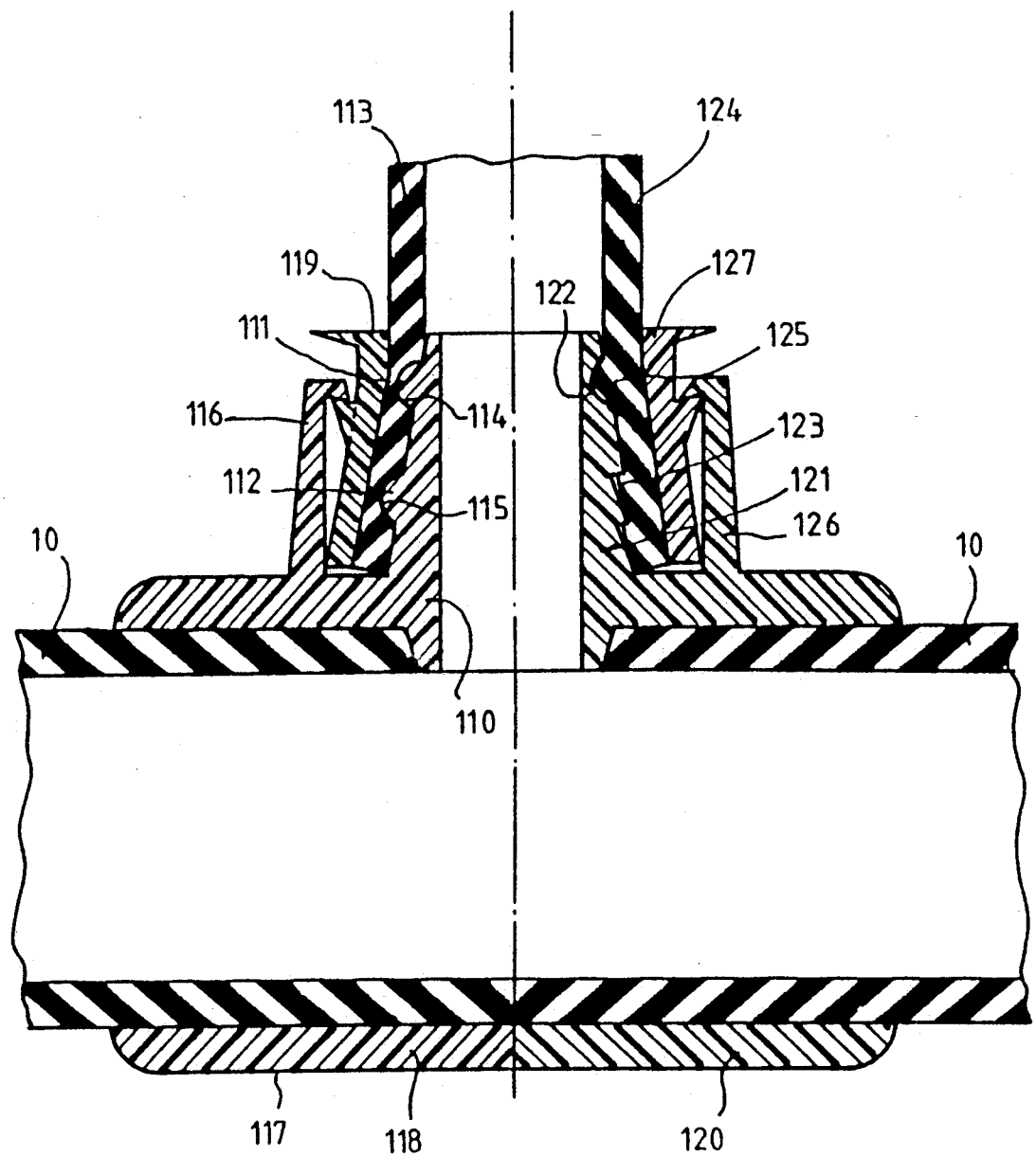
FIG. 9 is a view similar to that of FIG. 8 for two further embodiments each illustrated in a half view.

In the embodiment shown in the left hand part of FIG. 9, which is very close to that which has just been described immediately above, the stub 110, similar to stub 105 of the preceding embodiment, is formed on its external surface with ribs 111 and 112 with a cross section in the form of an arc of a circle, the secondary tube or pipe 113 then being formed, in its end zone, with grooves 114 and 115 of a cross section matching that of the ribs. In this embodiment also it is via a hollow shaft 116 projecting from the external surface 116 of the sleeve 118 molded in situ that sleeve 119 similar to sleeve 102 of the preceding embodiment is snap fitted on the molded connection.

In the embodiment illustrated in the right hand part of FIG. 9, molding of sleeve 120 on the main rubber based tube or pipe 10 is carried out so as to form a tubular stub 121 whose surface has both an annular groove 122 and a fish scale or herringbone patterned part 123, the secondary tube or pipe 124 then being formed with an annular flange 125 projecting from its internal face. As in the three embodiments described immediately above, a hollow shaft 126, with no shaped end, is provided for cooperating with a rib of matching shape of a sleeve 127 gripping the secondary tube or pipe 124.

Figure 10:
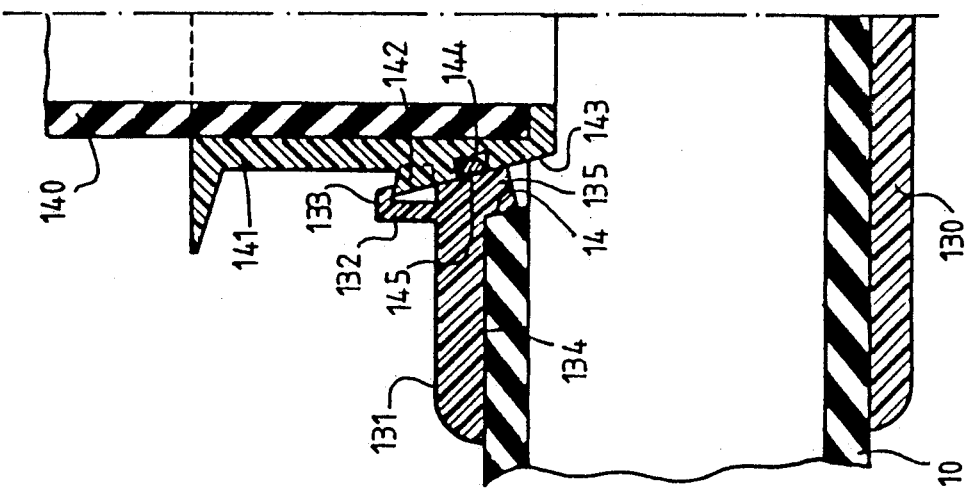
FIG. 10 is a half view similar to FIG. 6 and 7 for another embodiment.

In the embodiment shown in FIG. 10, the main rubber based tube or pipe 10 is provided with a sleeve 130 over the major part of the angular periphery of said tube, said sleeve made from a plastic material molded in situ being formed on its external face 131 with a hollow shaft of small height 132 with end nose-piece 133 and on its internal surface 144 with an appendix 143 housed in the orifice 14 of the tube or pipe 10. A secondary tube or pipe 140, also made from a rubber based material, is provided on its external face with a sleeve 141 having a rib 142 adapted for cooperating with the nose-piece 133 and a truncated cone shaped end-piece 143, in which a groove is formed for receiving an O seal 145. In the assembled condition, the truncated cone part 143 of sleeve 141 cooperates by a tapered fit with the internal surface of appendix 135, the O seal 145 providing good sealing with respect to the fluid flowing through the tube or pipe 10 and the secondary tube or pipe 14.

In the embodiment shown in FIGS. 11 to 15, the main rubber based tube or pipe is provided with a branch connection 150 made from a plastic material molded in situ on the tube or pipe 10 and which includes a tubular section 151, coaxial with the tube or pipe 10 and a tubular section 152, with axis Y slanted with respect to the axis of the tube or pipe 10. On section 152 is fixed a secondary tube or pipe 153, coaxial with said section and held thereon by means of a ring 154 made from a molded or bonded plastic material. In such an embodiment, the invention also provides complementarily for giving to the in situ molded plastic material the shape of a shoe 160, for example with triangular contour (FIG. 11) and at the angles of which fixing holes 161, 162 and 163 are formed, the sole plate 160 being further formed with a hole 165, having the same axis and the same diameter as those of the tubular section 151. Such a device, which may be provided with several tubular branch sections such as 152 is particularly suitable for fixing to a motor vehicle part or similar. When for a given application, the assembly must be sealed, the invention provides a groove 169 on one face of shoe 160, or on a tubular part 170 extending section 151, said groove being adapted to receive a seal 171, FIGS. 14 and 15, integrally molded or simply fixed in said groove.

What is claimed is:

1. A hose assembly comprising a flexible rubber hose and a rigid integral and unitary plastic branch connection extending from a first section of said flexible rubber hose, said first section having a first axially extending length;
    said rigid plastic branch connection having a sleeve shaped part molded about and adherent with said first section of said flexible rubber hose along an exterior part of said first section of said flexible rubber hose;
    said rigid plastic branch connection having a branch shaped part integral and unitary with said sleeve shaped part and projecting from said sleeve shaped part;
    said branch shaped part extending through an opening in said flexible rubber hose to the hollow interior of said flexible rubber hose;
    said flexible rubber hose having a second section substantially beyond said first section, said first and second sections having the same internal diameter.

2. A hose assembly according to claim 1, further comprising an insert within said branch shaped part of said sleeve.

3. A hose assembly according to claim 1, said hose having a through orifice (14) and said rigid plastic branch connection having an annular portion (17) extending through said orifice (14) so as to enable communication of a hollow interior of said branch shaped part with said hollow interior of said flexible rubber hose.

4. A hose assembly according to claim 3, wherein said branch shaped part projects radially with respect to said first part.

5. A hose assembly according to claim 4, wherein said branch shaped part terminates in an end flange.

6. A hose assembly according to claim 4, comprising a second rubber hose having a first end, and wherein said branch shaped part (22) has a distal extremity molded onto said first end of said second rubber hose.

7. A hose assembly according to claim 4, comprising a second rubber hose having a first end, and wherein said branch shaped part (22) has an inner surface shaped for accomodating said first end of said second rubber hose.

8. A hose assembly according to claim 7, further comprising means for securing said second rubber hose to said branch shaped part.

9. A hose assembly according to claim 8, wherein said means comprise a ring having a first end abuting against said first part of said branch connection and a second end partially surrounding at least partially said first end of said second rubber tube.

10. A hose assembly according to claim 8, further comprising a further sleeve about said second rubber hose and wherein the securing means are built up by snap fitting parts respectively provided on said further sleeve and at least one of said first part and branch shaped part of said branch connection.

11. A hose assembly according to claim 1, wherein said branch shaped part projects at a small, acute angle with respect to said rubber hose.

12. A hose assembly according to claim 11, wherein said branch shaped part has a generally tubular shape, wherein said first part of said branch connection comprises an extension coaxial with said first hose, having an inner diameter equal to that of said first rubber hose and extending flush with said first hose, said assembly further comprising a second rubber hose mounted onto said branch shaped part.

13. A hose assembly according to claim 11, wherein said branch connection further comprises a second branch shaped part, said second branch shaped part projecting radially with respect to said rubber hose.

14. A hose assembly according to claim 3, wherein said branch shaped part (32) has inner and outer surfaces, one at least of the inner and outer surfaces of said branch shaped part being at least partially threaded.

15. A hose assembly according to claim 1 wherein said rubber of said first flexible rubber hose comprises a rubber selected from the group consisting of EPDM, polychloroprene and silicone.

16. A hose assembly comprising a flexible rubber hose having a hollow interior and a rigid integral and unitary plastic branch connection having a first rigid sleeve shaped part molded onto and adherent with an exterior surface of said flexible rubber hose along a first longitudinal extend thereof;
    said rigid plastic branch connection having a branch shaped part integral and unitary with said first sleeve shaped part and projecting outwardly from said first sleeve shaped part, said branch shaped part having a hollow interior which is in communication with said hollow interior of said flexible rubber hose;
    said first rigid sleeve shaped part adhering to said exterior surface of said flexible rubber hose for a period of 1800 hours under fluid pressure of 4 bars within the hollow interior of said hose;
    there being no internal support within the hollow interior of said flexible rubber hose along said first longitudinal extent.

17. A hose assembly according to claim 16 wherein said hose has both a substantially uniform wall thickness and a substantially uniform internal diameter along and at locations beyond said first longitudinal extent.

* * * * *